United States Patent [19]

Sullaway et al.

[11] 4,165,891
[45] Aug. 28, 1979

[54] BREECH BLOCK CONNECTOR

[75] Inventors: Bob L. Sullaway; Lloyd C. Knox, both of Duncan, Okla.

[73] Assignee: Halliburton Company, Duncan, Okla.

[21] Appl. No.: 899,757

[22] Filed: Apr. 24, 1978

[51] Int. Cl.² ............................................. F16L 37/00
[52] U.S. Cl. ........................................ 285/18; 285/81
[58] Field of Search ...................... 285/82, 84, 85, 87, 285/88, 91, 18, 33, 308, 313, 321, 81

[56] References Cited

U.S. PATENT DOCUMENTS

| 989,251 | 4/1911 | Hall | 285/88 |
|---|---|---|---|
| 3,521,911 | 7/1970 | Hanes et al. | 285/91 X |
| 3,827,728 | 8/1974 | Hynes | 285/313 X |
| 3,922,009 | 11/1975 | Giebeler | 285/87 |

FOREIGN PATENT DOCUMENTS 942790 11/1963 United Kingdom ...................... 285/321

*Primary Examiner*—Mervin Stein
*Assistant Examiner*—Carl Pietruszka
*Attorney, Agent, or Firm*—John H. Tregoning; James R. Duzan

[57] ABSTRACT

A breech block connector for use in securing wash pipe sections together comprising sleeve means, pin means, box assembly means and locking means.

11 Claims, 4 Drawing Figures

BREECH BLOCK CONNECTOR

This invention relates to an improved connector assembly for pipes and the like. More specifically, this invention relates to an improved connector for wash pipes.

In offshore platforms the platform is usually anchored to the sea floor by means of pilings driven through the platform's jacket legs and/or pile sleeves. When driving the pilings into the sea floor, wash piping is usually employed to wash or jet out sediment which prevents the pile from being driven into the sea floor.

Typically, a wash pipe bundle is approximately forty to fifty feet in length and comprises three or more separate tubular members held together by means of weld plates or bracing. In a wash pipe bundle the tubular members usually comprise an air pipe, a water pipe and a return pipe. During washing operations air and water are pumped under pressure via the air and water pipes respectively to the bottom of the piling to wash the sediment therefrom with the sediment being returned to the surface along with the aerated water by means of the return pipe.

In the past, the individual pipes of the wash pipe bundle have been connected to their respective pipes in a corresponding bundle by means of either a threaded type connection or a bolted flange type connection. However, these types of connections are difficult to assemble. For instance, the use of bolted flange type connections requires a large amount of time to assemble while the use of a threaded type connection requires a means of suspending the wash pipe bundle so that it may be rotated to make up the connection. Usually, if the wash pipe bundle must be suspended, it is necessary to use a derrick which means an extra piece of equipment must be present at the offshore location.

In contrast to these prior art type connections, the present invention relates to an improved connector for wash pipes which may be easily and quickly assembled without requiring the wash pipe bundle to be rotated. The present invention comprises a breech block type connector assembly adapted for use in wash pipes.

The foregoing advantages and the preferred embodiment of the present invention will be better understood from the following specification taken in conjunction with the accompanying drawings wherein.

Figure 1:
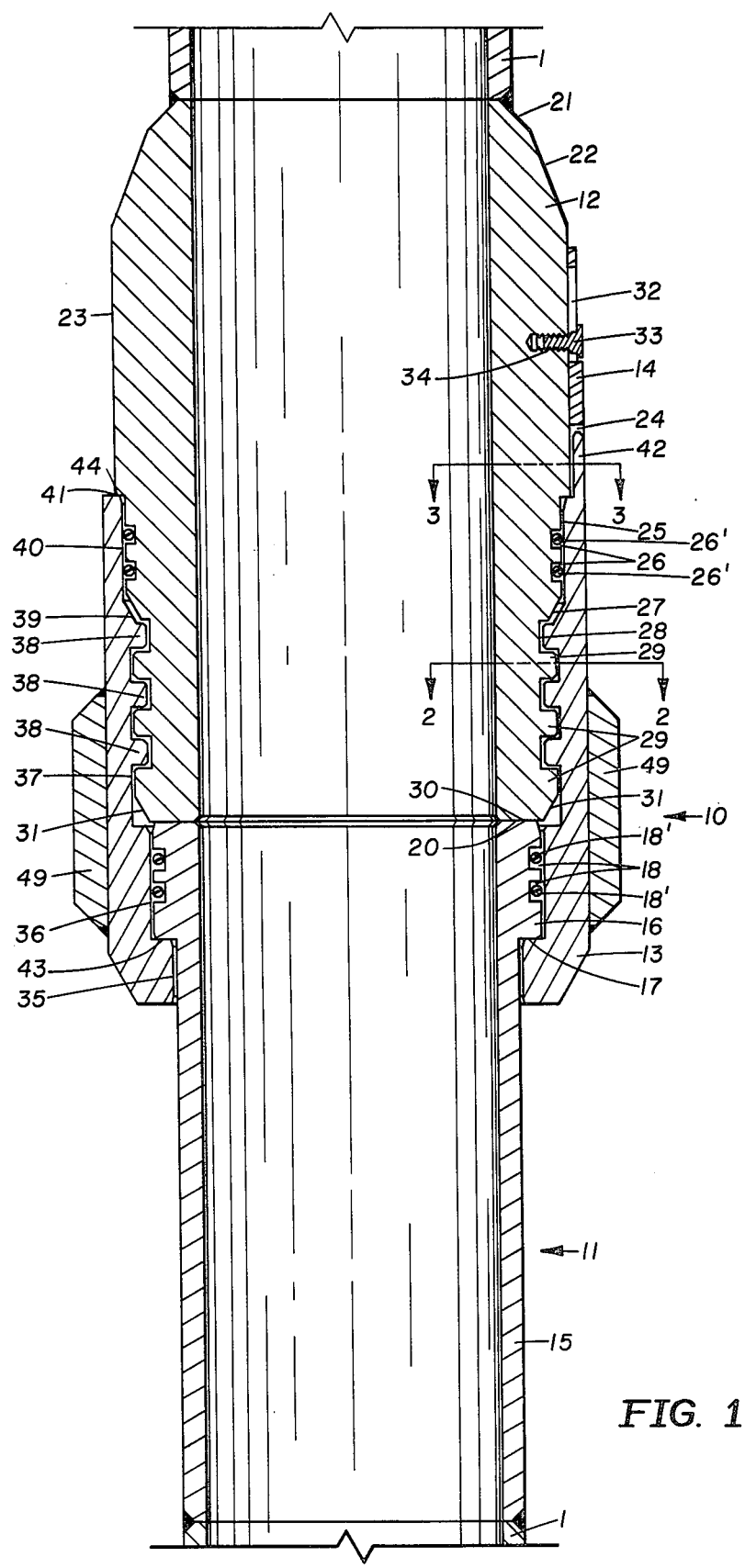
FIG. 1 is a cross-sectional view of the present invention.

Referring to FIG. 1, the present invention is shown in its preferred embodiment.

The breech block type connector 10 comprises sleeve means 11, pin means 12, box assembly 13 and locking means 14.

The sleeve means 11 comprises a cylindrical member 15 having an enlarged end 16 thereon. The sleeve 11 is secured to the wash pipe 1 by any suitable means, such as welding. The enlarged end 16 is formed having an annular shoulder 17 thereon for the surface 43 of box assembly 13 to abut and having annular seal cavities 18 therein. Retained within annular seal cavities 18 are suitable seal means 18', such as elastomeric O-ring type seals. When the breech block type connector is assembled the seal means 18' abut bore 36 of the box assembly 13 to prevent any fluid leakage therefrom. The surface 20 of enlarged end 16 of the sleeve means 11 abuts annular surface 30 of pin means 12 of the breech block type connector 10.

The pin means 12 comprises a cylindrical member having a first conically shaped surface 21, a second conically shaped surface 22, first cylindrical surface 23 having a T-shaped recess 24 located therein, second cylindrical surface 25 having annular seal cavities 26 located therein, third conically shaped surface 27, third cylindrical surface 28 having a plurality of lug members 29 located thereon, and annular surface 30 which abuts surface 20 of sleeve means 11. The lug members 29 which are located adjacent annular surface 30 are formed with beveled surfaces 31 to facilitate initial assembly of the pin means 12 and box assembly 13. Located within annular seal cavities 26 are suitable seal means 26', such as elastomeric O-ring type seal means, to prevent any fluid leakage from the breech block type connector 10 during fluid flow therethrough.

The T-shaped recess 24 located in the cylindrical surface 23 of the pin means 12 receives the locking means 14 therein. The locking means 14 comprises a rectangular member having a slot 32 located in a portion thereof through which passes a securing means 33 to secure the locking means 14 within T-shaped recess 24 of the pin means 12. The securing means may be of any suitable type, such as a threaded member having a knurled, slotted or regularly shaped head and a threaded portion which mates with threaded bore 34 located in the pin means 12.

The box assembly 13 comprises a cylindrical member having a first bore 35, second bore 36, third bore 37 having a plurality of lug members 38 located thereon, conically shaped annular surface 39, fourth bore 40 and an indexing means 42. The indexing means 42 comprises a rectangular projection extending from surface 41 of the box assembly. The indexing means 42 is received in the circumferential extending portion of the T-shaped slot 24 located in the pin means 12.

Figure 2:
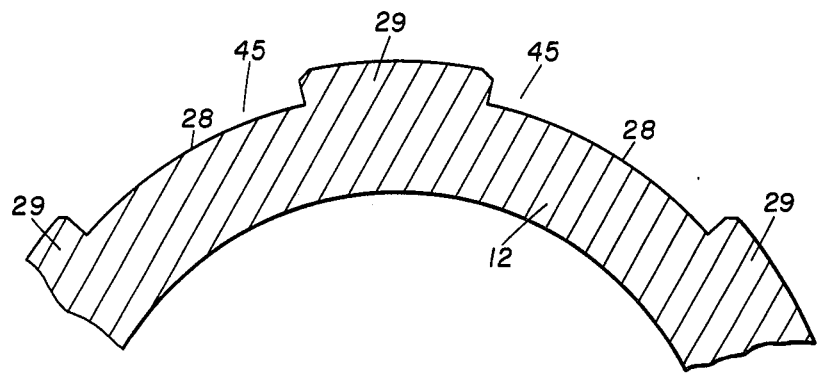
FIG. 2 is a partial cross-sectional view of the pin means of the present invention taken along line 2—2 of FIG. 1.

Referring to FIG. 2, a portion of the pin means 12 is shown. As shown, the lug members 29 of the pin means 12 are circumferentially spaced from each other as well as being longitudinally spaced from each other (See FIG. 1). The cylindrical surface 28 of the pin means 12 can be formed with any desired number of lug members 29 thereon provided that an equal number of lug members 38 are formed on bore 37 of box assembly 13. As shown, the lug member 29 are separated having circumferential spaces 45 therebetween. The circumferential spaces 45 are of sufficient size to allow lug members 38 of the box assembly 13 to pass between adjacent lug members 29 of pin means 12 to allow the breech block type connector 10 to be assembled.

Figure 3:
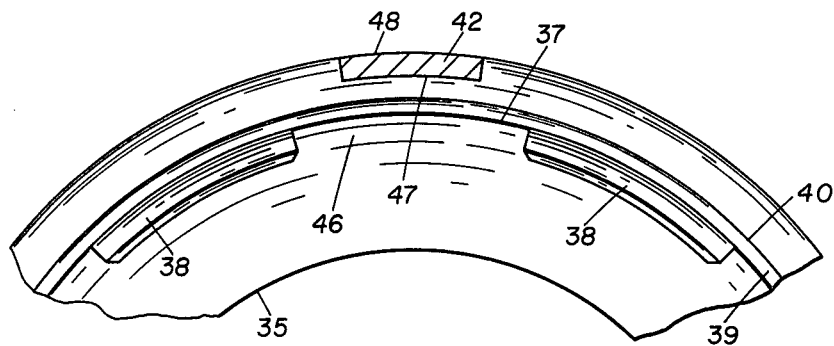
FIG. 3 is a partial cross-sectional view of the box assembly of the present invention taken along line 3—3 of FIG. 1.

Referring to FIG. 3, a portion of the box assembly 13 is shown. Similar to the pin means 12, the lug members 38 of the box assembly 13 are circumferentially spaced from each other as well as being longitudinally spaced from each other (See FIG. 1). The bore 37 of the box assembly 13 can be formed with any desired number of lug members 38 thereon provided that an equal number of lug members 29 are formed on the cylindrical surface 28 of pin means 12. The lug members 38 are separated having circumferential spaces 46 therebetween. The circumferential spaces 46 are of sufficient size to allow lug members 29 of the pin means 12 to pass between adjacent lug members 38 of box assembly 13 to allow the breech block type connector 10 to be assembled.

As further shown in FIG. 3, the indexing means 42 of the box assembly 13 extends about a portion of the box assembly 13 and has a cylindrical inner surface 47 and cylindrical outer surface 48. As illustrated, the indexing means 42 is located on the box assembly 13 such that it is in aligned relationship with a space 46 between lug members 38 of the box assembly 13. The indexing means 42 can be of any convenient width, although for convenience it is usually of slightly less width than the space 46 between the lug means 38 of the box assembly 13.

Figure 4:
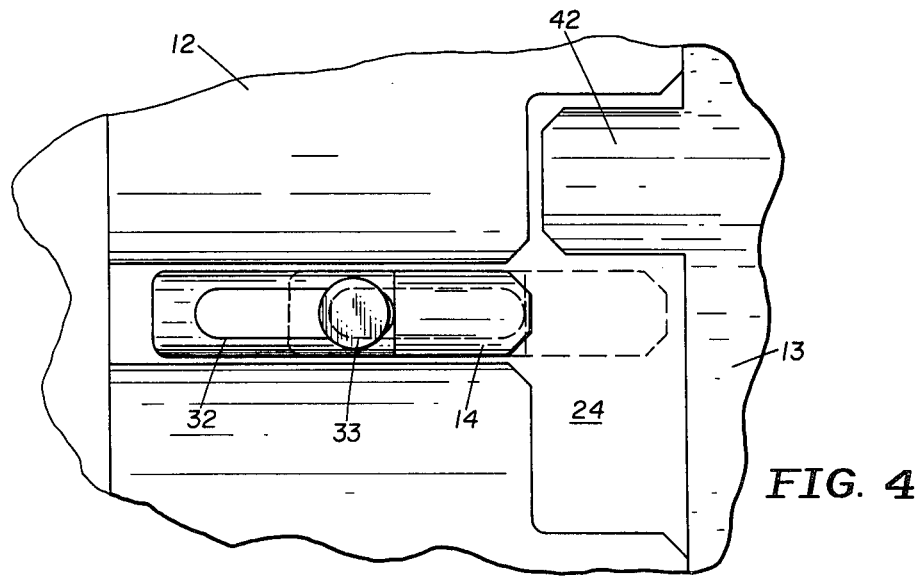
FIG. 4 is a top view of the locking means of the present invention as shown in FIG. 1.

Referring to FIG. 4, the relationship between the locking means 14 and indexing means 42 can be seen as well as the shape of the T-shaped recess 24. As shown, the indexing means 42 is retained in the circumferential portion of the T-shaped recess 24 in the pin means 12. The circumferential portion of the T-shaped recess 24 extends about the periphery of the pin means 12 a distance equal to approximately the combined width of the lug means 29, pin means 12 and the space 46 between lug means 38 of the box assembly 13.

The circumferential portion of the T-shaped recess 24 is further formed in the pin means 12 such that approximately one-half of the circumferential portion, the right hand portion of the circumferential portion when the T-shaped recess 24 as viewed from the lug means 29 of the pin means 12, of recess 24 is aligned with a lug means 29 while the remaining portion of the circumferential portion of the recess is aligned with the circumferential space 45 between adjacent lug means 29 on the pin means 12.

The longitudinal portion of the T-shaped recess 24 retains the locking means 14 therein. The locking means 14 is retained within the longitudinal portion by securing means 33. As can be clearly seen, the locking means 14 contains a slot 32 therein which allows the locking means 14 to be moved into and out of engagement with the indexing means 42 of the box assembly 13 when the breech block type connector 10 is assembled. When the breech block type connector 10 is assembled with the lug members 29 of the pin means 12 and the lug members 38 of the box assembly 13 being engaged, as shown in FIG. 4, the indexing means 42 of the box assembly 13 is located in the right hand portion of the circumferential portion of the T-shaped recess 24 in the pin means 12. To maintain the pin means 12 and the box assembly 13 in engagement the locking means 14 is moved into engagement with indexing means 42 and the securing means 33 advanced into engagement with the locking means 14. This position is shown by the broken outline of the locking means 14 in FIG. 4.

To assemble the breech block type connector 10 the sleeve 11 is moved into engagement with pin means 12 such that surface 20 of the sleeve 11 is abutting surface 30 of the pin means 12. The box assembly 13 is rotated on sleeve 11 until the indexing means 42 of the box assembly 13 is aligned with the left hand portion of the circumferential portion of the T-shaped recess 24 in pin means 12. When the indexing means 42 of the box assembly 13 is in aligned relationship to the left hand portion of the circumferential portion of the T-shaped recess 24, the lug members 29 of the pin means 12 are aligned with spaces 46 between the lug means 38 of box assembly 13 while the lug means 38 of box assembly 13 are aligned with the spaces 45 between lug means 29 of pin means 12.

When in aligned relationship, the box assembly 13 can be moved longitudinally over pin means 12 until shoulder 43 of box assembly 13 abuts surface 17 of sleeve 11 or until surface 41 of box assembly 13 abuts shoulder 44 of pin means 12. To engage the lug members 29 with lug members 38 the box assembly 13 is rotated on sleeve 11 until the indexing means 42 is located in the right hand portion of the circumferential portion of the T-shaped recess 24 in the pin means 12. The pin means 12 and box assembly 13 can then be maintained in this engaged position by moving the locking means 14 into engagement with indexing means 42. If the box assembly 13 cannot be easily rotated into engagement with pin means 12, ribs 49 are provided about the exterior of the box assembly 13 to facilitate the use of tools to mate the pin means 12 and box assembly 13.

It should be noted that although only one indexing means 42 and T-shaped recess 24 have been illustrated, any number of indexing means and T-shaped recesses may be employed to assemble the breech block type connector 10. It also should be noted that the location of indexing means 42 and the T-shaped recess 24 and locking means 14 may be on either the pin means 12 or the box assembly 13. Additionally, the seal means 18' and 26' can be located on the box assembly 13 if it is made sufficiently thick. However, the foregoing changes to the breech block type connector 10 are undesirable as they increase the size and complexity of the connector.

From the foregoing, it can be easily seen that the breech block type connector 10 when used to connect the individual tubular members of a wash pipe bundle offers several advantages over the prior art type threaded connections or flange type connections.

One advantage is that no rotation of the wash pipe bundle is required. It is only necessary to rotate the individual box assemblies of the breech block type connector.

Another advantage is that the connections between the individual tubular members of the wash pipe bundle may be quickly made since the breech block type connector includes an alignment means and the box assembly of the connector only needs to be rotated the width of a lug means to engage the pin means and box assembly of the connector.

Yet another advantage is that a positive locking means is used to maintain the breech block type connector assembled thereby preventing accidental release of the connector.

Still yet another advantage is the inclusion of O-ring type sealing members on the pin means and box assembly of the breech block type connector thereby allowing a positive leakproof connection for each tubular member of the breech block type connector which may be easily repaired by merely replacing the sealing members.

Finally, the use of breech block type connectors in connecting the individual tubular members of a wash pipe bundle results in a more rigid string of wash pipe since all the members of the string are connected rather than only one or more.

Having thus described my invention, I claim:

1. A breech block connector for use in securing a first tubular member to a second tubular member, said connector comprising:

sleeve means secured to one of said first tubular member and said second tubular member;

pin means secured to the other of said first tubular member and said second tubular member, said pin means having one end thereof abutting one end of said sleeve means and having recess means in the exterior surface thereof;

box assembly means retained on said sleeve means being slidable and rotatable thereon, said box assembly means engaging said pin means;

indexing means located on said box assembly means for aligning said box assembly means and said pin means for the assembly of said box assembly means over said pin means, said indexing means being received in the recess means located in the exterior surface of said pin means; and locking means located on said pin means for maintaining said pin means and said box assembly means engaged thereby connecting said first tubular member to said second tubular member.

2. The breech block connector of claim 1 further comprising:

seal means located in the end of said sleeve means abutting said pin means to sealingly engage said box assembly means; and seal means located on said pin means to sealingly engage said box assembly means.

3. The breech block connector of claim 2 further comprising:

rib means located on said box assembly means to facilitate assembly of said connector.

4. A breech block connector for use in securing a first tubular member to a second tubular member, said connector comprising:

sleeve means secured to one of said first tubular member and said second tubular member;

pin means secured to the other of said first tubular member and said second tubular member, said pin means having one end thereof abutting one end of said sleeve means and having a plurality of radially and longitudinally spaced lug members located on the exterior thereof;

box assembly means retained on said sleeve means being slidable and rotatable thereon, said box assembly means having a plurality of radially and longitudinally spaced lug members located on an interior surface thereof, said plurality of lug members engaging said plurality of lug members located on said pin means thereby maintaining said pin means and box assembly means in assembled relationship;

seal means located in the end of said sleeve means abutting said pin means to sealingly engage said box assembly means;

seal means located on said pin means to sealingly engage said box assembly means;

rib means located on said box assembly means to facilitate assembly of said connector; and locking means located on said pin means for maintaining said pin means and said box assembly means engaged thereby connecting said first tubular member to said second tubular member.

5. The breech block connector of claim 1 wherein the recess means in the exterior surface of said pin means comprises a recess means having a portion extending about a portion of the periphery of said pin means and having a portion extending in a direction along the length of said pin means.

6. The breech block connector of claim 5 wherein said locking means is located in the portion of the recess means of said pin means which extends in a direction along the length of said pin means.

7. The breech block connector of claim 4 with said pin means further having recess means in the exterior surface thereof.

8. The breech block connector of claim 7 further comprising:

indexing means located on said box assembly means for aligning said box assembly means and said pin means for the assembly of said box assembly means over said pin means, said indexing means being received in the recess means located in the exterior surface of said pin means.

9. The breech block connector of claim 8 wherein the recess means in the exterior surface of said pin means comprises a recess means having a portion extending about a portion of the periphery of said pin means and having a portion extending in a direction along the length of said pin means.

10. The breech block connector of claim 9 wherein said locking means is located in the portion of the recess means of said pin means which extends in a direction along the length of said pin means.

11. A breech block connector for use in securing a first tubular member to a second tubular member, said connector comprising:

sleeve means secured to one of said first tubular member and said second tubular member;

pin means secured to the other of said first tubular member and said second tubular member, said pin means having one end thereof abutting one end of said sleeve means, having a plurality of radially and longitudinally spaced lug members located on a portion of the exterior surface thereof, and having recess means in another portion of the exterior surface thereof, the recess means having a portion extending about a portion of the periphery of said pin means and having a portion extending in a direction along the length of said pin means;

box assembly means retained on said sleeve means being slidable and rotatable thereon, said box assembly means having a plurality of radially and longitudinally spaced lug members located on an interior surface thereof, said plurality of lug members engaging said plurality of lug members located on said pin means thereby maintaining said pin means and said box assembly means in assembled relationship;

seal means located in the end of said sleeve means abutting said pin means to sealingly engage said box assembly means;

seal means located on said pin means to sealingly engage said box assembly means;

rib means located on said box assembly means to facilitate assembly of said connector;

indexing means located on said box assembly means for aligning said box assembly means and said pin means for the assembly of said box assembly means over said pin means, said indexing means being received in the portion of the recess means extending about a portion of the periphery of said pin means; and locking means located in the portion of the recess means which extends in a direction along the length of said pin means, said locking means maintaining said pin means and said box assembly means engaged thereby connecting said first tubular member to said second tubular member.

* * * * *